United States Patent
Nomura et al.

(10) Patent No.: US 10,768,838 B2
(45) Date of Patent: Sep. 8, 2020

(54) STORAGE APPARATUS AND DISTRIBUTED STORAGE SYSTEM

(71) Applicant: HITACHI, LTD., Tokyo (JP)

(72) Inventors: Shimpei Nomura, Tokyo (JP); Masahiro Tsuruya, Tokyo (JP); Akifumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/325,286

(22) PCT Filed: Jan. 12, 2017

(86) PCT No.: PCT/JP2017/000883
§ 371 (c)(1),
(2) Date: Feb. 13, 2019

(87) PCT Pub. No.: WO2018/131127
PCT Pub. Date: Jul. 19, 2018

(65) Prior Publication Data
US 2019/0205053 A1 Jul. 4, 2019

(51) Int. Cl.
G06F 12/00 (2006.01)
G06F 3/06 (2006.01)
G06F 9/50 (2006.01)

(52) U.S. Cl.
CPC .......... *G06F 3/0632* (2013.01); *G06F 3/0604* (2013.01); *G06F 3/0605* (2013.01); *G06F 3/0644* (2013.01); *G06F 3/0665* (2013.01); *G06F 3/0689* (2013.01); *G06F 9/5077* (2013.01)

(58) Field of Classification Search
CPC .... G06F 3/0604; G06F 3/0605; G06F 3/0632; G06F 3/0644; G06F 3/0665; G06F 3/0689; G06F 9/5077
See application file for complete search history.

(56) References Cited

U.S. PATENT DOCUMENTS

2013/0086316 A1* 4/2013 Shah .................... G06F 12/0866
711/113
2015/0378613 A1* 12/2015 Koseki .................. G06F 3/0608
711/103
2017/0220282 A1* 8/2017 Dambal ................ G06F 3/0631

FOREIGN PATENT DOCUMENTS

WO 2014/196000 A1 12/2014
WO 2015/008375 A1 1/2015

OTHER PUBLICATIONS

International Search Report of PCT/JP2017/000883 dated Apr. 18, 2017.

* cited by examiner

Primary Examiner — Gurtej Bansal
(74) Attorney, Agent, or Firm — Mattingly & Malur, PC

(57) ABSTRACT

When a logical capacity of a nonvolatile semiconductor memory is increased, after a logical capacity which is allocated to a RAID group but unused is released, the RAID group is reconfigured to include the released logical capacity and the increased logical capacity. When the logical capacity of the nonvolatile semiconductor memory is reduced, after the reduced logical capacity is released from the RAID group, the RAID group is reconfigured with the released logical capacity.

12 Claims, 14 Drawing Sheets

FIG. 9

1001
VIRTUAL VOLUME MANAGEMENT TABLE

| VIRTUAL VOLUME # (1002) | POOL # (1003) | VIRTUAL VOLUME LBA (1004) | VIRTUAL CHUNK # (1005) | RG # (1006) | CHUNK # (1007) |
|---|---|---|---|---|---|
| 0 | 0 | 0x00000000 | 0 | 0 | 0 |
|   |   | 0x00000400 | 1 | 0 | 1 |
|   |   | 0x00000800 | 2 | NULL | NULL |
|   |   | ... | ... | ... | ... |
| ... | ... | ... | ... | ... | ... |

FIG. 10

1101
POOL MANAGEMENT TABLE

| POOL # (1102) | RG # (1103) | CHUNK # (1104) | RG LBA (1105) | STATUS (1106) | POOL REMAINING CAPACITY (1107) |
|---|---|---|---|---|---|
| 0 | 0 | 0 | 0x00000000 | ALLOCATED | 750 GB |
|   |   | 1 | 0x00000400 | ALLOCATED |   |
|   |   | 2 | 0x00000800 | UNALLOCATED |   |
|   |   | ... | ... | ... |   |
|   | ... | ... | ... | ... | ... |
| ... | ... | ... | ... | ... | ... |

FIG. 11

RAID GROUP MANAGEMENT TABLE (1201)

| RG # (1202) | RAID CONFIGURATION # (1203) | RAID LEVEL (1204) | RAID CONFIGURATION (1205) | STRIPE BLOCK SIZE (1206) | DEVICE # (or NODE #) (1207) | ALLOCATED LBA RANGE (1208) | ALLOCATED CAPACITY (1209) | RG TOTAL CAPACITY (1210) | RG REMAINING CAPACITY (1211) | RG CREATION ALLOWANCE GROUP # (1212) |
|---|---|---|---|---|---|---|---|---|---|---|
| 0 | 0 | RAID5 | 3D1P | 8KB | 0 | 0x00000000-0x7FFFFFFF | 750GB | 1500GB | 750GB | 0 |
|   |   |   |   |   | 1 | 0x00000000-0x7FFFFFFF | 750GB |   |   |   |
|   |   |   |   |   | 2 | 0x00000000-0x7FFFFFFF | 750GB |   |   |   |
|   |   |   |   |   | 3 | 0x00000000-0x7FFFFFFF | 750GB |   |   |   |
| 1 | 5 | RAID5 | 5D1P | 8KB | 4 | 0x00000000-0x5FFFFFFF | 750GB | 1750GB | 500GB | 1 |
|   |   |   |   |   | 5 | 0x00000000-0x5FFFFFFF | 750GB |   |   |   |
|   |   |   |   |   | ... | ... | ... |   |   |   |
| ... | ... | ... | ... | ... | ... | ... | ... | ... | ... | ... |

FIG. 12

MEMORY DEVICE MANAGEMENT TABLE (1301)

| DEVICE # (1302) | DEVICE TYPE (1303) | LOGICAL CAPACITY IN USE (1304) | EMPTY LOGICAL CAPACITY (1305) | RG-UNALLOCATED LOGICAL CAPACITY (1306) | PHYSICAL CAPACITY IN USE (1307) | EMPTY PHYSICAL CAPACITY (1308) | RG CREATION ALLOWANCE GROUP # (1309) |
|---|---|---|---|---|---|---|---|
| 0 | SSD (MLC) | 200GB | 560GB | 10GB | 55GB | 70GB | 0 |
| 1 | SSD (MLC) | 200GB | 640GB | 90GB | 45GB | 80GB |   |
| ... | ... | ... | ... | ... | ... | ... |   |
| ... | ... | ... | ... | ... | ... | ... | ... |

*FIG. 13*

| RAID CONFIGURATION # | RG CREATION ALLOWANCE GROUP # | PRIORITY | RAID LEVEL | STRIPE CONFIGURATION | NUMBER OF CONFIGURATION DEVICES (or NODES) |
|---|---|---|---|---|---|
| 0 | 0 | 5 | RAID5 | 3D1P | 4 |
| 1 |   | 4 | RAID5 | 2D1P | 3 |
| ... |   | ... | ... | ... | ... |
| 5 | 1 | 2 | RAID5 | 5D1P | 6 |
| 6 |   | 1 | RAID5 | 3D1P | 4 |
| ... | ... | ... | ... | ... | ... |

RG CONFIGURATION PRIORITY MANAGEMENT TABLE (1501)

NODE CAPACITY MANAGEMENT TABLE (1401)

| NODE # | LOGICAL CAPACITY IN USE | EMPTY LOGICAL CAPACITY | RG-UNALLOCATED LOGICAL CAPACITY | RG CREATION ALLOWANCE GROUP |
|---|---|---|---|---|
| 0 | 200GB | 560GB | 10GB | 0 |
| 1 | 200GB | 640GB | 90GB |  |
| ... | ... | ... | ... |  |
| ... | ... | ... | ... | ... |

Columns: 1402, 1403, 1404, 1405, 1406

STORAGE APPARATUS AND DISTRIBUTED STORAGE SYSTEM

TECHNICAL FIELD

The present invention relates to an information processing system, a storage apparatus, and a memory device.

BACKGROUND ART

As a solid state drive (SSD) using a NAND type flash memory as a storage medium becomes widespread, the use of the SSD has become common instead of a hard disk drive (HDD) as the storage medium in a storage system. Compared with the HDD, the SSD can implement a fast access and can be installed as the memory device of the storage apparatus, such that the speed of the storage apparatus can be increased. In addition, development for practical use of the SSD including a nonvolatile semiconductor memory capable of faster access than flash memories, such as a resistance random access memory (ReRAM) and a phase change random access memory (PRAM) is under development.

On the other hand, the SSD has higher price per capacity than the HDD. Therefore, in the case of using the SSD, technologies of reducing a capacity of stored data such as data compression and de-duplication are important. For example, PTL 1 discloses a technology of providing a larger logical capacity than a physical capacity of a semiconductor storage medium included in the SSD by compressing data stored in the SSD and reducing the capacity of the used semiconductor storage medium.

In addition, there is a certain limitation on a rewriting frequency of the nonvolatile semiconductor memory which is the storage medium of the SSD. That is, the SSD has a life span. For example, if the writing frequency for the nonvolatile semiconductor memory exceeds the predetermined number of upper limit, it is not possible to normally read and write data from and into the nonvolatile semiconductor memory. In addition, the variation in quality of the nonvolatile semiconductor memory is becoming larger with the progress of fine processing. Therefore, some of the nonvolatile semiconductor memories in the SSD may not be used.

For example, PTL 2 discloses a technology for reducing a logical capacity provided by the SSD and maintaining a function when some of the nonvolatile semiconductor memories cannot be used due to a failure.

CITATION LIST

Patent Literature

PTL 1: WO 2015/008375 A1
PTL 2: WO 2014/196000 A1

SUMMARY OF INVENTION

Technical Problem

For the high reliability of the system, the storage apparatus uses technologies such as redundant array of independent (or IneXpensive) disks (RAID). In the RAID, a memory area is reserved from a plurality of memory devices and managed as a group (hereinafter, referred to as a RAID group). Then, redundant data called a parity are created from write data, and a set (hereinafter, referred to as a RAID stripe) of the write data and the parity created from the write data is stored in different memory devices within the RAID group. Thus, when a failure occurs in the memory device, the data stored in the broken memory device can be recovered from the data and the parity stored in other memory devices included in the RAID group.

On the other hand, when the memory device whose logical storage capacity varies as described above is used for the storage apparatus, it is preferable to appropriately cope with the variation. In addition, there is a similar problem in a distributed storage system constituted by a plurality of nodes having a plurality of memory devices.

Solution to Problem

A storage apparatus according to one embodiment of the present invention includes a plurality of memory devices and a storage controller configured to be connected to a host computer and provide the plurality of memory devices as a virtual volume to the host computer. Each of the plurality of memory devices includes a plurality of nonvolatile semiconductor memories and a device controller providing the storage controller with a logical memory area associated with the plurality of nonvolatile semiconductor memories. The storage controller manages the plurality of memory devices by dividing the plurality of memory devices into a plurality of device groups, configures a first RAID group using a first subgroup including a plurality of memory devices within a first device group among the plurality of device groups, and configures a second RAID group using a second subgroup including the plurality of memory devices within the first device group, all or some of the memory devices among the plurality of memory devices belonging to the first subgroup also belong to the second subgroup, and the device controller transmits to the storage controller increase information indicating that a usable logical capacity of the plurality of nonvolatile semiconductor memories is increased. The storage controller adds an increased logical capacity of the first memory device to an unallocated capacity which is a logical capacity not allocated to the RAID group when the increase information is received from the first memory device which is a memory device of the first device group, releases from the first RAID group or the second RAID group a first unused capacity which is a logical capacity in which data are not written into the first RAID group and a second unused capacity which is a logical capacity in which data are not written into the second RAID group, respectively, and reconfigures the first RAID group and the second RAID group so that a part or all of the unallocated capacities are allocated to the first RAID group or the second RAID group after the released logical capacity is added to the unallocated capacity.

BRIEF DESCRIPTION OF DRAWINGS

FIG. 9 is an explanatory diagram of a virtual volume management table.

FIG. 10 is an explanatory diagram of a pool management table.

FIG. 11 is an explanatory diagram of a RAID group management table.

FIG. 12 is an explanatory diagram of a memory device management table.

FIG. 13 is an explanatory diagram of an RG configuration priority management table.

DESCRIPTION OF EMBODIMENTS

Hereinafter, embodiments of the present invention will be described with reference to the drawings. It should be noted that these embodiments are merely examples for realizing the present invention and do not limit the technical scope of the present invention.

According to an embodiment of the present invention, when a logical capacity of a nonvolatile semiconductor memory is increased, after a logical capacity which is allocated to the RAID group but unused is released, a RAID group is reconfigured to include the released logical capacity and the increased logical capacity. According to another embodiment, when the logical capacity of the nonvolatile semiconductor memory is reduced, after the reduced logical capacity is released from the RAID group, the RAID group is reconfigured with the released logical capacity.

Figure 1:
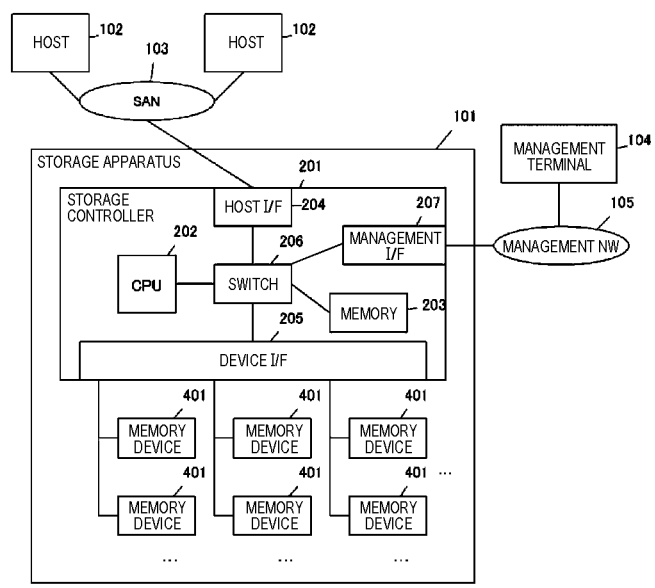
FIG. 1 is a configuration diagram of a storage apparatus to which the present invention is applied.

FIG. 1 shows a configuration diagram of a storage apparatus 101 according to a first embodiment of the present invention.

As shown in FIG. 1, the storage apparatus 101 has a storage controller 201 and a plurality of memory devices 401 connected to the storage controller 201. One or more hosts (host computer) 102 are connected to the storage apparatus 101. In addition, a management terminal 104 is connected to the storage apparatus 101.

The storage controller 201 includes a CPU 202, a memory 203, a host interface (host I/F) 204, a device interface (device I/F) 205, and a management interface (management I/F) 207. The CPU 202, the memory 203, the host I/F 204, the device I/F 205, and the management I/F 207 are connected to each other via a switch 206.

Although only one of these components is shown in FIG. 1, a plurality of components may be installed in the storage controller 201 in order to achieve high performance and high availability. In addition, the components may be connected to each other via a common bus instead of a switch 206.

The device I/F 205 has at least an interface controller and a transfer circuit. The interface controller is a component which converts a protocol (SAS in the example) used by the memory device 401 into a communication protocol (for example, PCI-EXpress) used inside the storage controller 201. The transfer circuit is used when the storage controller 201 transmits (read or write) data to the memory device 401.

Like the device I/F 205, the host I/F 204 includes at least the interface controller and the transfer circuit. The interface controller of the host I/F 204 is for converting between a communication protocol (for example, fiber channel) used in a data transfer path between the host 102 and the storage controller 201 and a communication protocol used inside the storage controller 201.

The CPU 202 performs various controls of the storage apparatus 101. The memory 203 is used to store programs executed by the CPU 202 and various management information of the storage apparatus 101 used by the CPU 202. In addition, the memory 203 is also used for temporarily storing I/O target data for the memory device 401. The memory 203 is constituted by volatile storage media such as DRAM and SRAM, but as another embodiment, the memory 203 may be configured using a nonvolatile memory.

The switch 206 connects the CPU 202, the memory 203, the host I/F 204, the device I/F 205, and the management I/F 207 to each other in the storage controller 201, and performs routine of data exchanged between the parts according to an address or an ID.

The storage apparatus 101 and the host 102 are connected to each other via a storage area network (SAN) 103. The SAN 103 is formed by, for example, a device according to the fiber channel standard.

The storage apparatus 101 and the management terminal 104 are connected to each other via a management NW 105. The management NW 105 is formed by, for example, Ethernet (registered trademark).

It should be noted that the SAN 103 and the management NW 103 may be configured as the same network. For example, the storage apparatus 101, the host 102, and the management terminal 104 may be connected to a network formed by the Ethernet.

The host 102 includes hardware resources such as a processor, a memory, an input/output device and a host bus adapter, and software resources such as a device driver, an operating system (OS), and an application program. In the host 102, the processor generates a command (for example, a read command or a write command) according to a program on the memory, and transmits the command to the storage apparatus 101 via the SAN 103.

The management terminal 104 is a computer for performing a management operation of the storage apparatus 101. The management terminal 104 includes the input/output device such as a keyboard and a display, and an administrator can instruct setting of the storage apparatus 101 using the input/output device. In addition, the management terminal 104 can also display information such as a state of the storage apparatus 101 on an output device such as a display. The management terminal 104 may be built in the storage apparatus 101.

The storage apparatus which is one of the embodiments is described above.

Figure 2:
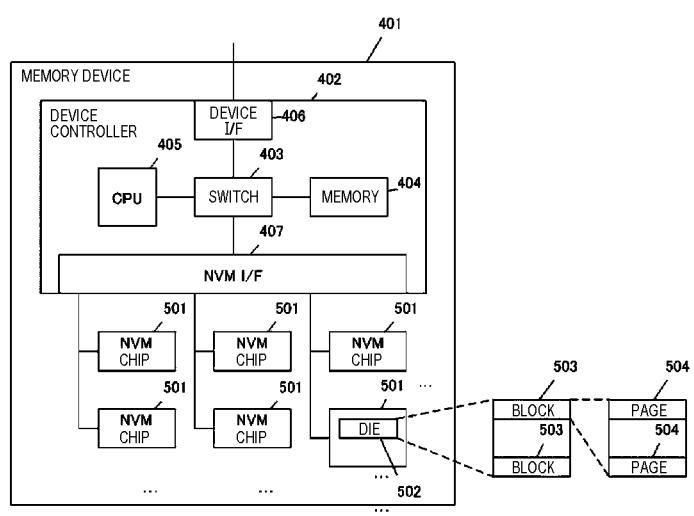
FIG. 2 is a configuration diagram of a memory device.

FIG. 2 shows a configuration example of the memory device 401 using a non-volatile memory (NVM) as a storage medium.

The memory device 401 is used to store write data from an external device such as the host 102. As an example, the memory device 401 is connected to the storage controller 201 by a transmission line (SAS link) according to the serial attached SCSI (SAS) standard, a transmission line (PCI link) according to a peripheral component interconnect (PCI) standard, or the like.

The memory device 401 includes a memory device controller 402 and a plurality of NVM chips 501. The memory device controller 402 includes a CPU 405, a device I/F 406, an NVM I/F (NVM interface) 407, and a memory 404, which are connected to each other via a switch 403.

The device I/F 406 is an interface controller for performing communication between the memory device 401 and a host device such as the storage controller 201. The device I/F 406 is connected to a device I/F 205 of the host device such as the storage controller 201 via the transmission line (SAS link or PCI link).

The NVM I/F 407 is an interface controller for performing communication between the memory device controller 402 and an NVM chip 501. In addition, the NVM I/F 407 may have a function of generating an error correcting code (ECC), and performing an error detection and an error correction using the ECC. As an example of the ECC, a BCH code or a low density parity check (LDPC) code or the like may be used.

The CPU 405 performs processing and the like relating to various commands received from the memory device controller 402. The memory 404 stores programs executed by the CPU 405 and various management information. In addition, an area of a part of the memory 404 is also used as a buffer for temporarily storing the write data transmitted together with a write command from the storage controller 201 or the data read from the NVM chip 501. As the memory 404, the volatile memory such as the DRAM is used. However, as the memory 404, a nonvolatile memory may be used.

The NVM chip 501 is, for example, a nonvolatile semiconductor memory chip such as a NAND type flash memory. In the nonvolatile semiconductor memory chip such as the NAND type flash memory, data are read and written in units of page 504. Data erasure is performed in units of blocks 503 which are a set of pages 504. The page 504 once written cannot be overwritten, and in order to write again into the page 504 once written, it is necessary to erase the entire block 503 including the page 504. In the NVM chip 501, there are a plurality of dies 502 as an aggregate of blocks 503, and the plurality of pages 504 are also present in the block 503. A size of each page 504 is equal, for example 8 KB.

Next, a memory area within the RAID group (RG) will be described with reference to FIG. 3. The storage apparatus 101 manages the memory areas of the plurality of memory devices 401 as one RAID group. When a data access cannot be made due to a failure occurring in one (or two) of the memory devices 401 in the RAID group, data in the remaining memory device 401 are used to be able to recover data stored in the broken memory device 401.

Figure 3:
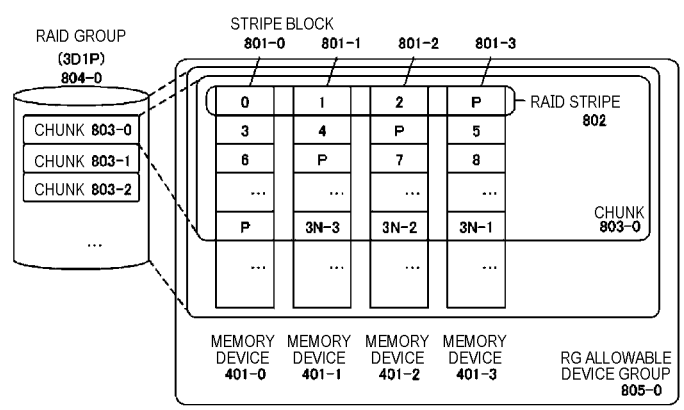
FIG. 3 is a diagram showing RAID configuration example 1 of the storage apparatus.

In FIG. 3, each of the memory devices 401-0 to 401-3 indicates a logical address space (LBA space) provided by the memory device 401. The memory area managed by the logical address is a logical memory area. Upper ends of the memory devices 401-0 to 401-3 indicate a head address (LBA=0) of the logical address space, and lower ends thereof are ends of the logical address space. The storage controller 201 configures one RAID group 804 from a plurality of (four in the example of FIG. 3) memory devices 401, and manages logical address spaces (memory devices 401-0 to 401-3) of the respective memory devices 401 belonging to the RAID group 804 by dividing the logical address spaces into a memory area having a plurality of fixed size called a stripe block 801.

In addition, FIG. 3 shows an example in the case where a RAID level (which indicates a data redundancy scheme in the RAID technology, and therefore there are generally RAID levels of RAID0 to RAID6) of the RAID group 804 is RAID5. In FIG. 3, boxes such as "0", "1", and "P" within the RAID group 804 indicate a stripe block 801, and a size of the stripe block 801 is 64 KB, 256 KB, 512 KB, or the like. In addition, the number such as "1" attached to each stripe block 801 is referred to as "stripe block number".

In FIG. 3, the stripe block 801 written as "P" in the stripe block 801 is a stripe block 801 in which redundant data (parity) are stored, which is hereinafter referred to as a "parity block". On the other hand, the stripe block 801 into which numerals (0, 1, or the like) are written is the stripe block 801 in which data (data which is not redundant data) written from the host 102 or the like are stored. Hereinafter, the stripe block 801 is referred to as a "data block". Redundant data generated using a plurality of data blocks are stored in the parity block.

Hereinafter, a set of data blocks (for example, elements 802 in FIG. 3) used for generating the parity block and the redundant data stored in the parity block will be referred to as a "RAID stripe".

In a RAID group 804-0 of FIG. 3, one RAID stripe 802 is composed of three data blocks and one parity block, and such a RAID group is referred to as 3D1P (3 Data+1 Parity) configuration. In the case of the storage apparatus 101 according to the present embodiment, like the RAID stripe shown in FIG. 3, the RAID stripe 802 is configured under a rule that each stripe block 801 belonging to one RAID stripe 802 is present on the same location (address) on memory devices 401-0 to 401-3.

In addition, the storage controller 201 manages a plurality of RAID stripes 802 continuously arranged in the RAID group 804 in units called "chunk". As shown in FIG. 3, one chunk 803 has a plurality of RAID stripes 802. However, one chunk 803 may be configured to have only one RAID stripe 802.

Each chunk 803 is allocated a unique identification number within the RAID group, and this identification number is called a chunk number. A chunk number of a chunk 803 including a head RAID stripe 802 (RAID stripe composed of the stripe block 801 at the head of the memory device 401-0 to the memory device 401-3) of the RAID group is set to 0, and each chunk 803 located thereafter is allocated continuous integer values.

As described above, since each chunk 803 is regularly arranged in the RAID group 804, the address on the LBA space of the memory device 401 belonging to the chunk 803 from the chunk number is calculated by a relatively simple calculation. Conversely, the chunk number of the chunk to which the address belongs is also calculated from the address on the LBA space of the memory device 401. The embodiment of the present invention is not limited to the form in which the chunk 803, the RAID stripe 802, and the stripe block 801 are regularly mapped. For example, the mapping of the chunk 803, the RAID stripe 802, and the stripe block 801 may be managed by the mapping table.

In addition, in the storage apparatus 101 according to the present embodiment, in order to limit the combination of the memory devices 401 configuring the RAID group, the storage controller 201 configures a plurality of RG creation allowance device groups 805. A creation of a RAID group between the plurality of memory devices 401 belonging to different RG creation allowance device groups 805 is prohibited.

Figure 4:
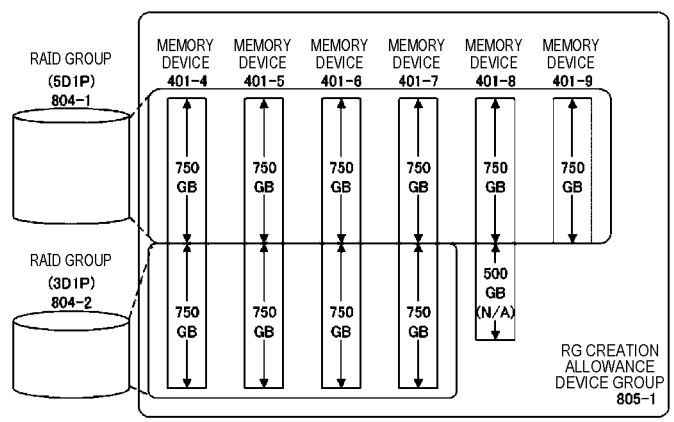
FIG. 4 is a diagram showing RAID configuration example 2 of the storage apparatus.

FIG. 4 shows the RAID group configured in the storage apparatus 101. In the storage apparatus 101, a plurality of RAID groups are constituted by the memory device groups 401-4 to the memory device 401-9 having different capacities. The storage apparatus 101 configures a RAID group using a plurality of memory devices within the same RG creation allowance device group. For example, the storage controller 201 may configure a first RAID group using a first subgroup including a plurality of memory devices within one RG creation allowance device group, and configure a second RAID group using a second subgroup including a plurality of memory devices within the same RG creation allowance device group. All or some of the memory devices among the plurality of memory devices belonging to the first subgroup may belong to the second subgroup. In FIG. 4, with setting the memory devices 401-4 to 401-9 as one subgroup, an area of 750 GB from a head address of the logical address space of the memory devices 401-4 to 401-9 is managed as a RAID group 804-1 having a 5D1P (5 Data+1 Parity) configuration, and with setting the memory devices 401-4 to 401-7 as one subgroup, an area of 750 GB from a tail address of the logical address space of the memory devices 401-4 to 401-7 is managed as a RAID group 804-2 having a 3D1P configuration. In addition, the space of 500 GB of the tail address of the logical address space of the memory device 401-8 is not incorporated in the RAID group 804, and data treated as an unallocated area not allocated to the RAID group are not stored. In FIG. 4, the memory areas of the memory devices 401-4 to 401-7 managed as the RAID group 804-1 and the RAID group 804-2 are continuously mapped in the same address space, but may be mapped to different address spaces. For example, the memory area of 750 GB included in the RAID group 804-1 of the memory device 401-4 and the memory area of 750 GB included in the RAID group 804-2 may each be managed as another address space with different name spaces. In the present embodiment, a plurality of memory areas included in different RAID groups in the same memory device 401 are mapped to different logical address spaces.

Figure 5:
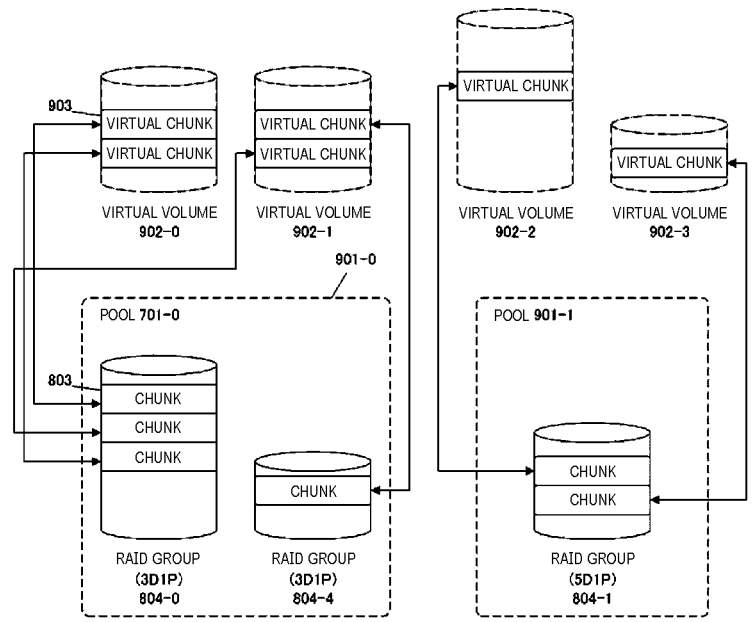
FIG. 5 is a configuration diagram of a logical volume.

FIG. 5 shows the relationship between a virtual volume 902 and the RAID group 804 in the present embodiment. In the storage apparatus 101 according to the present embodiment, one or more virtual memory spaces (elements 902 in FIG. 5) are provided to the host 102. This virtual memory space is called a "virtual volume". The memory space of the virtual volume is also managed for each area (element 903 in FIG. 5) divided into a predetermined size. This predetermined size area is called a "virtual chunk". The virtual chunk 903 is a unit in which a memory area is allocated to the virtual volume 902.

One chunk 803 is allocated to one virtual chunk 903, and data are stored in the mapped chunk 803 when data are written into the virtual chunk 903 from the host 102. However, when the chunk 803 is mapped to the virtual chunk 903, only the data block within the chunk 803 is mapped. Therefore, the size of the virtual chunk 903 may be equal to the total size of all the data blocks included in the chunk 803. The storage apparatus 101 manages the memory area (chunk 803) allocated to the virtual chunk 903 by recording the mapping between the virtual chunk 903 and the chunk 803 in a virtual volume management table 1001 described later.

Immediately after the virtual volume 902 is defined, the chunk 803 is not mapped to each virtual chunk 903 of the virtual volume 902. When receiving a write request for an area on the virtual chunk 903 from the host 102, the storage apparatus 101 starts determining the memory area (data block included in the chunk 803) on the logical address space of the RAID group 804 to which the data written into the area are to be written. In the chunk 803 determined here, one chunk 803 is determined from chunks 803 (unused chunks) which are not yet allocated to any virtual chunks 903.

In the storage apparatus 101 according to the present embodiment, one or a plurality of RAID groups 804 having a memory area (chunk 803) which can be allocated to the virtual chunk 902 is registered in a management unit called a pool 901. The storage apparatus 101 can manage one or more pools 901. When the storage apparatus 101 manages a plurality of pools 901, each RAID group 804 having a memory area which can be allocated to the virtual chunk 903 is registered in anyone of the plurality of pools 901. Hereinafter, the RAID group 804 (and a chunk 803 within the RAID group 804) managed by a certain pool 901 (temporarily, called pool X) will be referred to as a "RAID group (and chunk) belonging to the pool X". In addition, each virtual volume 902 is also registered in any one of the plurality of pools 901. When the chunk 803 is allocated to the virtual chunk 903 of the virtual volume 902, the storage apparatus 101 selects one unused chunk 803 from the pool 901 in which the virtual volume 902 is registered in advance, and allocates the selected chunk 803 to the virtual chunk 903.

Figure 6:
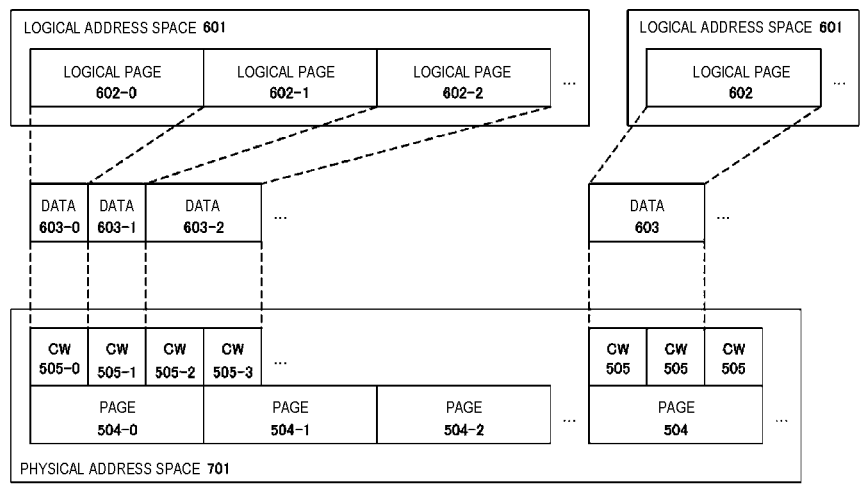
FIG. 6 is a diagram showing a configuration example of an address space of a memory device 401.

FIG. 6 is a diagram showing a configuration example of the address space of the memory device 401. Regarding the memory device 401, there are a logical address space 601 and a physical address space 701. The logical address space 601 is a unique address space that the memory device 401 provides to the host device such as the storage controller 201 and is an address space for identifying the logical memory area. On the other hand, the physical address space 701 is an address space for identifying the physical memory area in which actual data are stored. The device controller 402 divides the logical address space 601 into logical pages 602-0 to 602-2 which are a plurality of areas having the same size as the physical page 504, for example, and allocates physical pages 504-0 to 504-2, which are the physical address spaces, to each area. Here, in the present embodiment, the memory device 401 has a data compression function and a capacity virtualization function.

The data compression function of the device controller 402 compresses data of each logical page. For example, the data of logical pages 602-0 to 602-2 are converted into compressed data 603-0 to 603-2, respectively. Finally, the compressed data are stored in the physical page in units of codewords (hereinafter, CW). When the compressed data become less than or equal to the CW size, the rest is padded with zero data or the like.

In this diagram, the compressed data 603-0 to 603-2 are stored in CW 505-0 to CW 505-3, respectively. Since the compression rate is changed depending on a data pattern or the like, the size of the compressed data is not necessarily constant but has an arbitrary size. As described above, in the memory device 401 having the compression function, the number of physical pages to be used can be saved by storing data associated with a plurality of logical pages in one physical page. In addition, the memory device 401 has a capacity virtualization function and provides a larger logical space than the physical space to the outside. For example, the logical address space has a larger number of logical pages than the number of physical pages, and the logical address space 601 is extended until the physical address space 701 is full of the compressed data. That is, when all the physical address spaces stores data of a maximum compression rate, the maximum logical address space can be provided to the outside.

The device controller 402 can dynamically change the mapping between an address range (area) in which the logical address space 601 is configured and an address range (area) in which the physical address space 701 is configured by using a mapping table. In addition, the device controller 402 can create a plurality of logical address spaces as shown in this diagram and provide the created logical address spaces to the host device.

In addition, when the number of usable logical memory areas is increased by compressing data, the device controller 402 may transmit to the storage controller 201 the increase information indicating that the logical memory area is increased. The device controller 402 may transmit to the storage controller 201 the reduction information indicating that the usable logical memory area has been reduced when apart of the area cannot be used due to a failure of the nonvolatile semiconductor memory or the like.

Figure 7:
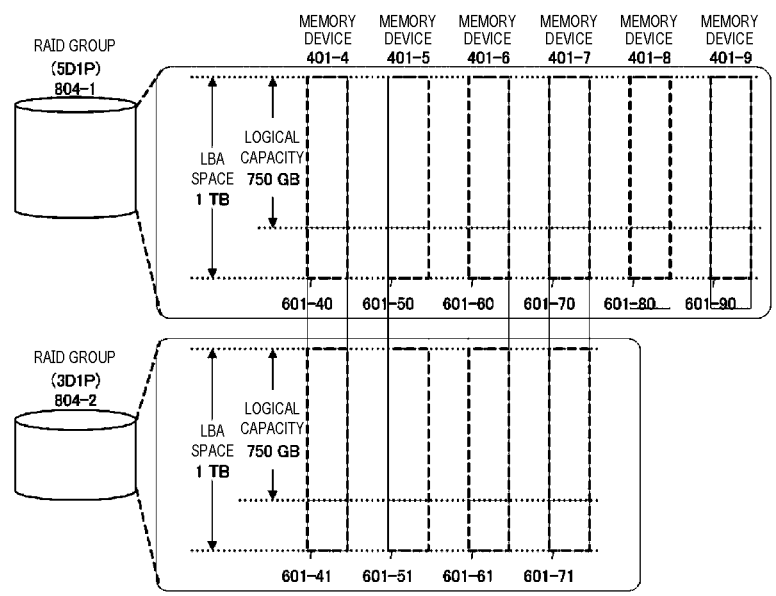
FIG. 7 is a diagram showing a logical address space in which each memory device is independent of each RAID group.

It is possible to manage the memory areas for each RAID group 804 as an independent logical address space by using the plurality of logical address spaces 601 provided by the memory device 401. FIG. 7 shows an example in which each memory device provides an independent logical address space for each RAID group in the RAID configuration shown in FIG. 4. In FIG. 7, the memory devices 401-4 to 401-9 provide logical address spaces 601-40 to 601-90 of 1 TB to the RAID group 804-1, and provide logical address space 601-41 to 601-71 of 1 TB to the RAID group 804-2. Although the size of the logical address space is actually different from the logical capacity of 750 GB allocated to each RAID group, since it is not necessary to allocate an actual page 504 to all the logical pages 602 configuring the logical address space, there is no problem even if the logical address space is increased when data of a size exceeding the logical capacity are not actually written. The logical capacity is managed by a memory device management table 1301.

Figure 8:
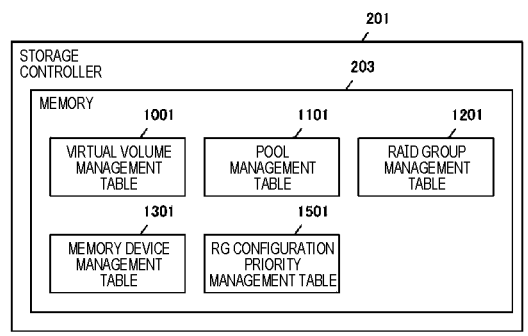
FIG. 8 is an explanatory diagram of management information of the storage apparatus.

FIG. 8 is a diagram showing the contents of management information stored in the memory 203 of the storage apparatus 101. At least virtual volume management table 1001, a pool management table 1101, a RAID group management table 1201, a memory device management table 1301, and an RG configuration priority management table 1501 are stored in the memory 203 of the storage apparatus 101.

FIG. 9 is a diagram for describing the configuration of the virtual volume management table. The virtual volume management table 1001 is a table for managing the mapping relationship between the virtual chunk 903 within each virtual volume 902 defined in the storage apparatus 101 and the chunk 803. The virtual volume management table 1001 has columns of a virtual volume #1002, a pool #1003, a virtual volume LBA 1004, a virtual chunk #1005, an RG #1006, and a chunk #1007. Each row (record) of the virtual volume management table 1001 indicates that the chunk 803 specified by the RG #1006 and the chunk #1007 is mapped to the virtual chunk 903 specified by the virtual volume #1002 and the virtual chunk #1005. Hereinafter, not only the virtual volume management table 1001 but also each row of a table that manages various kinds of information is called "record".

FIG. 10 is a diagram for describing the configuration of the pool management table. The pool is managed by the pool management table 1101. The pool management table 1101 has columns of a pool #1102, an RG #1103, a chunk #1104, an RG LBA 1105, a status 1106, and a pool remaining capacity 1107. In the pool management table 1101, each record is for storing information on the chunk 803. The RG #1103 of each record indicates a RAID group number of the RAID group 804 to which the chunk 803 belongs, and the pool #1101 indicates a pool number of the pool 901 to which the chunk 803 belongs. In addition, it can be said that the pool #1101 indicates the pool number to which the RAID group 804 specified by the RG #1103 belongs.

In addition, the RG LBA 1105 of each record is information indicating whether the chunk 803 is positioned at LBA of a node on the RAID group. The status 1106 is information indicating whether the chunk 803 is allocated to the virtual chunk 903. When "allocated" is stored in the status 1106, it means that the chunk 803 is allocated to the virtual chunk 903. Conversely, when "unallocated" is stored in the status 1106, it means that the chunk 803 is not allocated to the virtual chunk 903. The pool remaining capacity 1107 is a total size of chunks to which the status 1106 is "unallocated". The status 1106 is also referred to as unused capacity of pool.

FIG. 11 is a diagram for describing the configuration of the RAID group management table. The RAID group 804 is managed by the RAID group management table 1201. The RAID group management table 1201 has columns of an RG #1202, a RAID configuration #1203, a RAID level 1204, a RAID configuration 1205, a stripe block size 1206, device #1207, an allocated LBA range 1208, an allocated capacity 1209, an RG total capacity 1210, an RG remaining capacity 1211 and an RG creation allowance group #1212. It should be noted that the RAID group management table 1201 is also used in a second embodiment of the distributed storage system described later, but at this time, the device #1207 becomes the node #1207.

The RAID group number of the RAID group 804 is stored in the RG #1202. The RAID configuration #1203 indicates an identifier of the RAID configuration indicated by each record of the RG configuration priority management table 1501 to be described later. The RAID level 1204 indicates a redundancy scheme of the RAID group 804, which is specified by the RG #1202, by the RAID level defined in the RAID technology. The RAID configuration 1205 indicates the number of data blocks and the number of parity blocks configuring the RAID stripe 802 in the RAID group 804. The device #1207 stores an identifier of a component which provides the memory area included in the RAID group. In the storage apparatus 101, the identifier of the memory device 401 belonging to the RAID group 804 is stored in the device #1207. In the distributed storage system 301 of the second embodiment, an identifier (node #) of a node 302 belonging to the RAID group 804 is stored in the column 1207. When the memory device 401 provides a plurality of address spaces, the identifier indicating the address space may be stored in the column #1207. The allocated LBA range 1208 indicates the area on the logical address space allocated to the RAID group 804 of the memory device 401 specified by the device #1207. The allocated capacity 1209 indicates the capacity of the memory area that the memory device 401 allocates to the RAID group 804. The RG total capacity 1210 is a total value of capacity to write data into the RAID group 804 and is a value obtained by subtracting the capacity of redundant data from the total value of capacity determined in the allocated capacity 1209 of the memory device 401 belonging to the RAID group 804. The RG remaining capacity 1211 is a value obtained by subtracting the capacity of the chunk 803 allocated to the virtual chunk 903 from the total value of logical capacities of unused parts of the RAID group 804, that is, the total capacity of the RAID group 804. The RG creation allowance group #1212 indicates the identifier of the RG creation allowance device group 805 to which the RAID group 804 specified by the RG #1202 belongs. As described later, in the distributed storage system 301 of the second embodiment, the identifier of the RG creation allowance node group 806 is stored in the RG creation allowance group #1212.

FIG. 12 is a diagram for describing the configuration of the memory device management table 1301. The memory device management table 1301 has columns of a device #1302, a device type 1303, a logical capacity in use 1304, a free logical capacity 1305, an RG-unallocated logical capacity 1306, a physical capacity in use 1307, a free physical capacity 1308, and an RG creation allowance group #1309.

The identifier of the memory device 401 is stored in the device #1302. The device type 1303 indicates a type of disk, and for example, SSD (SLC), SSD (MLC), HDD and the like are stored. The logical capacity in use 1304 indicates the capacity of the memory area occupied by the chunk 803 allocated to the virtual chunk 903. It should be noted that the logical capacity indicates the capacity of data written (or can be written in the future) from the host device such as the storage controller 201. On the other hand, the data reduction processing such as compression is performed on the write data of the storage controller 201 or the like, and the capacity of data actually written into the NVM chip is called a physical capacity. The free logical capacity 1305 indicates the capacity of the memory area not allocated to the virtual chunk 903 as the chunk 803. The data capacity which can actually be written into the free logical capacity 1305 is determined by compressing data by applying the data reduction function after the write data arrives. Therefore, the value of the free logical capacity 1305 is calculated based on a certain policy (for example, the writable data capacity having the largest data reduction effect, or the like). The RG-unallocated logical capacity 1306 indicates the capacity of the memory area not allocated to any RAID group 804. The physical capacity in use 1307 indicates the capacity of valid data actually written into the NVM chip. The valid data means data which are not overwritten into the same LBA from the host device and data which are not invalidated by a command such as trim. The free physical capacity 1308 is the physical capacity of the corresponding memory device 401 into which the valid data are not written, and is calculated by subtracting the logical capacity in use from a total value of usable capacities of all the NVM chips 501 mounted in the corresponding memory device 401. The RG creation allowance group #1309 indicates the identifier of the RG creation allowance device group 805 to which the memory device 401 belongs. As described later, in the distributed storage system 301 of the second embodiment, the identifier of the RG creation allowance node group 806 is stored in the RG creation allowance group #1309.

FIG. 13 is a diagram for describing the configuration of the RG configuration priority management table 1501. The RG configuration priority management table 1501 has columns of a RAID configuration #1502, an RG creation allowance group #1503, a priority level 1504, a RAID level 1505, a stripe configuration 1506, and a configuration device 1507.

In the RG configuration priority management table 1501, each record is for storing information on the RAID configuration of the RAID group 804 which can be created with any RG creation allowance group 805. The RAID configuration #1502 indicates the identifier of the RAID configuration indicated by each record of the RG configuration priority management table 1501. The identifier of the RG creation allowance device group 805 is stored in the RG creation allowance group #1503. As described later, in the distributed storage system 301 of the second embodiment, the identifier of the RG creation allowance node group 806 is stored in the RG creation allowance group #1503. The priority 1504 is a value indicating the creation priority of the RAID configuration indicated by the record in the RG creation allowance device group 805. In the example of FIG. 13, a value 0 indicates that the RAID configuration has the lowest priority, and it is indicated that the greater the value, the higher the priority. The RAID level 1505 indicates the redundancy scheme of the RAID configuration by the RAID level defined in the RAID technology. The stripe configuration 1506 indicates the number of data blocks and the number of parity blocks configuring the RAID stripe 802 in the RAID configuration. The number of configuration devices 1507 indicates the number of memory devices 401 configuring the RAID group 804 in the RAID configuration. In the distributed storage system 301 of the second embodiment, the column 1507 indicates the number of nodes 302 configuring the RAID group 804 in the RAID configuration as the number of configuration nodes 1507.

Next, the processing when the capacity of the memory device 401 in the storage apparatus 101 is changed will be described. Here, regarding the RG creation allowance memory device group 805-1, the RAID configuration having six memory device configurations of 5D1P in RAID5 and four memory device configurations of 3D1P in RAID5 is configured in advance from one having the highest priority in the RG configuration priority management table 1501.

First, the operation of decreasing the logical capacity provided by the memory device 401-9 belonging to the RG creation allowance memory device group 805-1 shown in FIG. 4 will be described. When receiving the reduction information indicating that the logical capacity is reduced from the device controller 402 of the memory device 401-9 as the change notification of the logical capacity, the storage controller 201 performs RG-unallocated capacity supplement processing (FIG. 14) as described later in order to supplement the reduced logical capacity. After the capacity not allocated to the RAID group is increased by the RG-unallocated capacity supplement processing, the RG-unallocated capacity distribution processing (FIG. 16) is performed to reconfigure the RAID group.

As a cause of reduction in the logical capacity, there may be a partial failure of the NVM chip, for example. In the following description, when the valid data are lost due to the failure of such an NVM chip or the like, it is assumed that the restoration of the valid data is completed by rebuild processing based on the RAID technology before the notification of the logical capacity change (reduction information) and has already been stored in another memory area.

Figure 14:
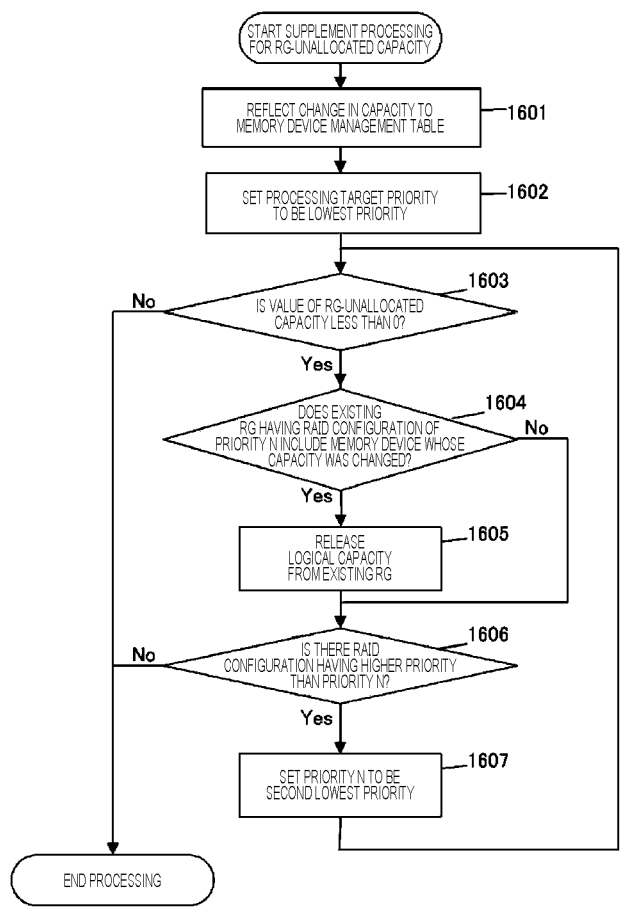
FIG. 14 is a flowchart of RG-unallocated capacity supplement processing.

FIG. 14 is a flowchart showing the operation of the storage controller 201 in the RG-unallocated capacity supplement processing. When the storage controller 201 receives the reduction information indicating the reduction of the logical capacity from any of the memory devices 401, the processing of FIG. 14 may be activated.

In processing 1601, the storage controller 201 reflects the reduction information notified from the memory device 401-9 to the memory device management table 1301. For example, when the logical capacity is reduced, in the record in which the device #1302 in the memory device management table 1301 indicates the identifier of the memory device 401-9, only the reduced logical capacity is subtracted from the values of the free logical capacity 1305 and the RG-unallocated logical capacity 1306. At this time, the RG-unallocated logical capacity 1306 may be preferentially subtracted. On the other hand, when the physical capacity is reduced, the reduced physical capacity is subtracted from the value of the free physical capacity 1308 for the selected record.

In processing 1602, the storage controller 201 sets a processing target priority. Here, among the RAID configurations which can be created by the RG creation allowance device group 805-1 to which the memory device 401-9 notified of the reduction information belongs, the lowest priority is set as the processing target priority. For example, the lowest value of the priority 1504 in the record in which the RG creation allowance group #1503 in the RG configuration priority management table 1501 is the identifier indicating the RG creation allowance device group 805-1 is substituted into a variable N indicating the processing target priority.

In processing 1603, the storage controller 202 determines whether the RG-unallocated logical capacity of the memory device 401-9 notified of the reduction information is less than 0 in the memory device management table 1301. For example, the device #1302 in the memory device management table 1301 determines whether the value of the RG-unallocated logical capacity 1306 is less than 0 in the record indicating the identifier of the memory device 401-9. When the value of the RG-unallocated logical capacity 1306 is less than 0, the process proceeds to processing 1604, and when the value of the RG-unallocated logical capacity 1306 is 0 or more, all the subsequent processings are not performed and the RG-unallocated capacity supplement processing ends.

In the present embodiment, a threshold value for determination in the processing 1603 is set to 0, but the threshold value for determination may be set to another or may be a value settable by the user.

In the processing 1604, the storage controller 202 checks whether the RAID group 804 having the RAID configuration of the processing target priority exists in the RG creation allowance device group 805-1. For example, in the record in which the RG creation allowance group #1503 in the RG configuration priority management table 1501 is the identifier indicating the RG creation allowance device group 805-1 and the priority 1504 matches the processing target priority N, the RAID configuration #1502 becomes the target RAID configuration in the processing 1604. Next, in the record in which the RG creation allowance group #1212 in the RAID group management table 1201 is the identifier indicating the RG creation allowance device group 805-1 and the RAID configuration #1203 is the target RAID configuration in the processing 1604, it is determined whether there is the record in which the device #1207 is the identifier indicating the memory device 401-9 notified of the reduction information. In the case where the record exists, that is, in the case where the RAID configuration of the processing target priority exists in the RG creation allowance device group 805-1, the RG #1202 is specified, and the process proceeds to processing 1605. In the case where there no record, that is, in the case where there is no RAID configuration of the processing target priority in the RG creation allowance device group 805-1, the process proceeds to processing 1606.

In the processing 1605, the storage controller 201 releases the logical capacity from the RAID group 804 corresponding to the processing target priority including the memory device 401-9 notified of the reduction information until the RG-unallocated logical capacity of the memory device 401-9 becomes 0 or more or until the free capacity of the RAID group becomes 0. For example, in the RAID group management table 1201, in the record where a value of RG # specified in the processing 1604 matches the RG #1202, the capacity corresponding to the logical capacity to be released is subtracted from the RG remaining capacity 1211 of the RAID group 804. The released capacity is added to the RG-unallocated capacities of each memory device 401 included in the RAID group 804 indicated by the selected record. At this time, only the value of the released capacity is subtracted from the RG remaining capacity 1211, and the value of the released capacity is equally allocated to each device and thus is added to the value of the RG-unallocated logical capacity 1306 of the record in which the device #1302 in the memory device management table 1301 indicates the memory device 401. For example, after the processing is performed, the capacity to be released may be the smaller one of (1) the capacity at which the RG-unallocated logical capacity of the memory device 401-9 notified of the reduction information is 0 or more or (2) the capacity at which the value of the RG remaining capacity 1211 is 0. After the completion of the processing 1605, the process proceeds to a processing 1606.

In the present embodiment, the logical capacity is released until the RAID group free area becomes 0, but for example, the threshold value may be determined, and thus the logical capacity may be released up to the determined value. In addition, for example, a unit size for releasing the logical capacity may be determined, and the logical capacity of the multiple of the unit size may be released. In addition, the unit size for releasing the logical capacity may be applied in processing 1702 or 1705 described later.

In the processing 1606, the storage controller 202 determines whether there is a RAID configuration having a higher priority than the processing target priority N in the RG creation allowance device group 805-1 to which the memory device 401-9 notified of the reduction information belongs.

For example, the storage controller 201 determines from the RG configuration priority management table 1501 whether there is the record in which the RG creation allowance group #1503 is the identifier indicating the RG creation allowance device group 805-1 and the priority 1504 exceeds the processing target priority N. If there is the record, the process proceeds to processing 1607. If there is no record, the RG-unallocated capacity supplement processing ends.

In the processing 1607, the storage controller 202 sets the processing target priority to the lowest priority among the remaining priorities of the RAID configuration which can be created by the RG creation allowance device group 805-1 to which the memory device 401-9 notified of the reduction information belongs. For example, the minimum value of the priority 1504 of the record specified in the processing 1606 is substituted into the variable N indicating the processing target priority.

After the processing 1607 ends, the process returns to the processing 1603 and the above-described processing is continued.

As a result, when the logical capacity of the memory device is reduced, the capacity corresponding to the reduced logical capacity is released from the logical capacity allocated to the RAID group, and the logical capacity of the RAID group is reduced. At this time, if the priority is set, the logical capacity is sequentially released from the RAID group having the low priority.

Figure 15:
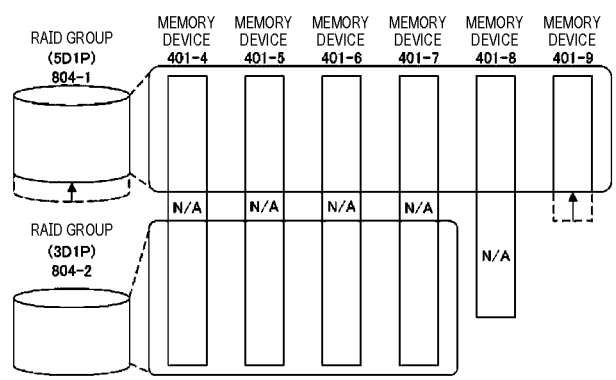
FIG. 15 is a diagram showing a RAID configuration example of the storage apparatus after the RG-unallocated capacity supplement processing.

FIG. 15 is a diagram showing a state in which the reduction information on the logical capacity provided by the memory device 401-9 is received from the memory device 401-9 belonging to the RG creation allowance memory device group 805-1 and the configuration of the RAID group 804 within the RG creation allowance memory device group 805-1 is changed when the storage controller 201 performs the above-described RG-unallocated capacity supplement processing.

Since the logical capacity of the memory device 401-9 is reduced and the RG-unallocated logical capacity of the memory device 401-9 is insufficient, the storage controller 201 releases from the RAID group 804-1 including the memory device 401-9 a part of an area in which the logical capacity is already allocated to the RAID group. In the example of the same diagram, the memory devices 401-4 to 401-8, whose logical capacities are unchanged, increase the RG-unallocated capacity due to the release of the logical capacity.

Figure 16:
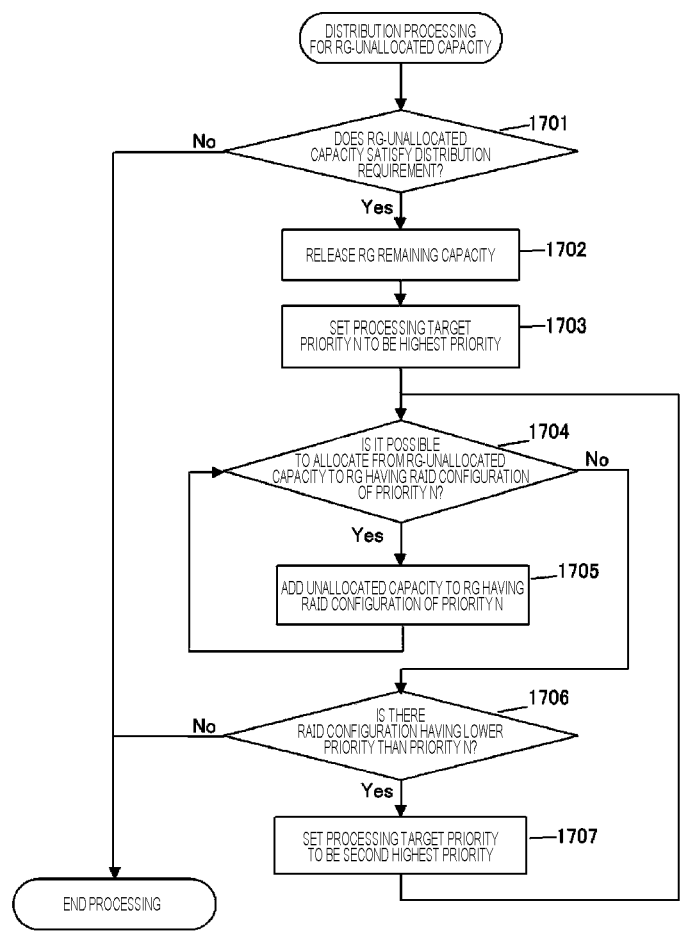
FIG. 16 is a flowchart showing RG-unallocated capacity distribution processing.

FIG. 16 is a flowchart showing the operation of the storage controller 201 in the RG-unallocated capacity distribution processing. With the end of the RG-unallocated capacity supplement processing, the storage controller 201 may perform the RG-unallocated capacity distribution processing. In addition, as will be described later, when the storage controller 201 receives the notification of the increase information indicating that the logical capacity of the memory device 401 is increased, the RG-unallocated capacity distribution processing may be performed based on the notification.

In processing 1701, the storage controller 201 confirms whether the RG-unallocated capacity distribution requirement is satisfied in the RG creation allowance device group 805-1 to which the memory device 401-9 notified of the capacity change (reduction information or increase information) belongs. The RG-unallocated capacity distribution requirement is, for example, that the total value of the RG-unallocated logical capacities of the memory devices 401-4 to 401-9 included in the RG creation allowance device group 805-1 is equal to or larger than a predetermined threshold value (for example, 100 GB) and the like. The authenticity of such an RG-unallocated capacity distribution requirement can be determined based on each management information of the RG configuration priority management table 1501 or the memory device management table 1301. If the determination on the RG-unallocated capacity distribution requirement is true, the process proceeds to processing 1702. If the RG-unallocated capacity distribution requirement is false, the RG-unallocated capacity distribution processing ends.

In the processing 1702, the storage controller 201 releases the unused capacity which is the logical capacity in which data are not written into the RAID group of the RG creation allowance device group 805-1 and sets the released unused capacity as the RG-unallocated logical capacity.

For example, the storage controller 201 selects from the RAID group management table 1201 the record in which the RG creation allowance group #1212 is the identifier indicating the RG creation allowance device group 805-1. Then, the storage controller 201 releases a part or all of the capacities of the RG remaining capacity 1211 which is the unused capacity of the RAID group 804 indicated by each selected record, and adds the released capacity to the RG-unallocated capacities of each memory device 401 included in the same RAID group. At this time, only the value of the released capacity is subtracted from the RG remaining capacity 1211. On the other hand, the value obtained by dividing the released capacity by the number of respective devices is added to the RG-unallocated logical capacity 1306 of the record in which the device #1302 in the memory device management table 1301 indicates the memory device 401.

In processing 1703, the highest priority of the RAID configuration which can be created by the RG creation allowance device group 805-1 is set to the processing target priority.

For example, the storage controller 201 selects from the RG configuration priority management table 1501 one or more records in which the RG creation allowance group #1503 is the identifier indicating the RG creation allowance device group 805-1. Next, the storage controller 201 sets the maximum value of the priority 1504 among the selected one or more records to the variable N indicating the processing target priority.

In the processing 1704, the storage controller 201 determines whether to secure the memory area added from the RG-unallocated logical capacities of the memory devices 401-4 to 401-9 included in the RG creation allowance device group 805-1 to the RAID group 804 of the RAID configuration of the processing target priority.

For example, the storage controller 201 selects from the RG configuration priority management table 1501 the record in which the RG creation allowance group #1503 is the identifier indicating the RG creation allowance device group 805-1 and the priority 1504 matches the processing target priority N. Here, the RAID configuration #1502 of the selected record is the target RAID configuration in the processing 1704. Next, the storage controller 201 selects from the RAID group management table 1201 the record in which the RG creation allowance group #1212 is the identifier indicating the RG creation allowance device group 805-1 and the RAID configuration 1205 indicates the target RAID configuration in the processing 1704. Here, the RG #1202 of the selected record is the target RAID group in the processing 1704. In addition, the device #1207 of the selected record is the target memory device in the processing 1704. Next, the storage controller 201 specifies the record in which the device #1302 indicates the target memory device in the processing 1704 in the memory device management table 1301, and acquires the value of the RG-unallocated logical capacity 1306 from the specified record. If the value of the RG-unallocated logical capacity 1306 is larger than 0 in all the target memory devices in the processing 1704, the memory area added to the RAID group 804 having the RAID configuration of the processing target priority can be secured. It should be noted that the threshold value used for determination of the above-described RG-unallocated logical capacity 1306 may not be 0.

If the determination result of the above-described processing 1704 is true, the process proceeds to the processing 1705, so that the storage controller 201 adds a capacity to the existing RAID group based on the RG #1202 indicating the target RAID group in the processing 1704 and the device #1302 indicating the target memory device in the processing

1704. If the determination in processing 1704 is false, the process proceeds to processing 1706. At this time, regarding the target memory device, when the logical capacity allocated to the target RAID group exceeds the size of the logical address space 601 provided to the target RAID group, the size of the logical address space 601 may be extended over the logical capacity.

In the processing 1704 described above, when there is no target RAID group in the processing 1704, the storage controller 201 may determine whether a new RAID group of the target RAID configuration in the processing 1704 can be created. At this time, the storage controller 201 determines from the RG-unallocated logical capacities of the memory devices 401-4 to 401-9 included in the RG creation allowance device group 805-1 whether to ensure the memory area for creating a new RAID group 804 having the target RAID configuration in the processing 1704.

For example, the storage controller 201 selects from the memory device management table 1301 the record in which the RG creation allowance group #1309 indicates the RG creation allowance device group 805-1. Next, the storage controller 201 selects records as many as the number of the configuration devices 1507 of the target RAID configuration in the processing 1704 from the selected records in the descending order of the values of the RG-unallocated logical capacity 1306. Here, the device #1302 of the selected record is the target memory device in the processing 1704. If all values of the RG-unallocated logical capacity 1306 of the target memory device are larger than 0, it is determined that the memory area for adding the RAID group 804 having the RAID configuration of the processing target priority can be secured. It should be noted that the threshold value used for determination of the above-described RG-unallocated logical capacity 1306 may not be 0. If the above-described determination is true, the process proceeds to the processing 1705, so that the storage controller 201 performs a new creation of the RAID group based on the RAID configuration #1203 indicating the target RAID configuration in the processing 1704 and the device #1302 indicating the target memory device in the processing 1704. If the determination on the RG-unallocated logical capacity 1306 is false, the process proceeds to processing 1706.

As described above, in the processing 1705, the RAID group is reconfigured by allocating the RG-unallocated capacity to the existing RAID group or creating a new RAID group using the RG-unallocated capacity.

In the case of performing the allocation to the existing RAID group in the processing 1705, the storage controller 201 may specify the minimum value of the RG-unallocated logical capacity 1306 in the target memory device in the processing 1704, and additionally allocate only the capacity of this minimum value from each of the target memory devices in the processing 1704 to the target RAID group in the processing 1704.

For example, the storage controller 201 selects the record matching the device #1302 in the target memory device in the processing 1704 from the memory device management table 1301. In addition, the storage controller 201 selects the record matching the RG #1202 indicating the target RAID group in the processing 1704 from the RAID group management table 1201. The storage controller 201 adds a capacity corresponding to an additionally allocated amount to the RG remaining capacity 1211 of the record selected from the RAID group management table 1201, and subtracts the capacity corresponding to the allocated amount from the RG-unallocated logical capacity 1306 selected from the memory device management table 1301.

On the other hand, in the case of generating the new RAID group in the processing 1705, the storage controller 201 may specify the minimum value of the RG-unallocated logical capacity 1306 from the target memory device in the processing 1704, and allocate only the capacity of this minimum value to the newly created RAID group.

For example, the storage controller 201 selects the record matching the device #1302 in the target memory device in the processing 1704 from the memory device management table 1301. In addition, the storage controller 201 selects the record matching the RAID configuration #1203 having the target RAID configuration in the processing 1704 from the RG configuration priority management table 1501. Next, the storage controller 201 creates, in the RAID group management table 1201, a new record indicating the RAID group of allocated capacity 0 configured by the target memory device in the processing 1704 of the target RAID configuration in the processing 1704. Here, the RG #1202 of the created record indicates the target RAID group in the processing 1704. Then, the storage controller 201 selects the minimum value of the RG-unallocated logical capacity 1306 in the record selected from the memory device management table 1301. The storage controller 201 additionally allocates the memory area from each target memory device to the target RAID group in the processing 1704 by the capacity of the minimum value. At this time, the storage controller 201 adds a capacity corresponding to an allocated amount to the RG remaining capacity 1211 of the new record, and subtracts a capacity corresponding to an amount allocated by each device from the RG-unallocated logical capacity 1306 of the target memory device in the processing 1704.

When the processing 1705 is completed, the process returns to the processing 1704.

In the processing 1704, when the memory area added from the RG-unallocated logical capacities of the memory devices 401-4 to 401-9 included in the RG creation allowance device group 805-1 to the RAID group 804 of the RAID configuration of the processing target priority can be secured, the process proceeds to processing 1706.

In the processing 1706, the storage controller 202 determines whether there is a RAID configuration having a lower priority than the processing target priority N in the RG creation allowance device group 805-1.

For example, the storage controller 202 determines from the RG configuration priority management table 1501 whether there is the record in which the RG creation allowance group #1503 is the identifier indicating the RG creation allowance device group 805-1 and the priority 1504 is below the processing target priority N. If there is the record, the process proceeds to processing 1607. If there is no record, the RG-unallocated capacity distribution processing ends.

In the processing 1707, the storage controller 202 sets the processing target priority to the highest priority among the remaining priorities of the RAID configuration which can be created by the RG creation allowance device group 805-1 to which the memory device 401-9 notified of the capacity change belongs. For example, the maximum value of the priority 1504 of the record specified in the processing 1706 is substituted into the variable N indicating the processing target priority.

After the processing 1707 ends, the process returns to the processing 1704 and the above-described processing is continued.

As a result, the area which is not allocated to the RAID group of the memory device can be added to the existing RAID group, or can be allocated to a RAID group newly created. At this time, if the priority is set, the logical capacity is sequentially allocated from the RAID group having the high priority.

Figure 17:
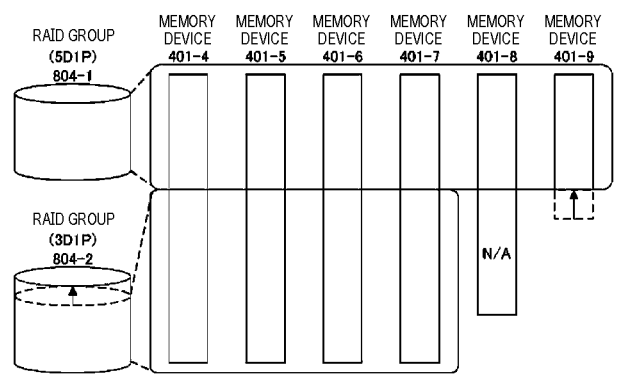
FIG. 17 is a diagram showing a RAID configuration example of the storage apparatus after RG-unallocated capacity distribution processing.

FIG. 17 is a configuration diagram after performing the RG reconfiguration processing by receiving the notification of the capacity change from the memory device. That is, this diagram shows the state of FIG. 15 formed by applying the RG-unallocated capacity processing supplement processing (FIG. 14) to the state of FIG. 4 and shows the RAID group 804 configuration within the RG creation allowance memory device group 805-1 to which the memory device 401-9 belongs after applying the unallocated capacity distribution processing (FIG. 16) to this state. The memory area which is not allocated to the RAID group of the memory devices 401-4 to 401-7 is added to the RAID group 804-2, and the capacity of the RAID group 804-2 is extended.

Hereinabove, the processing in the case where the logical capacity of the memory device 401 is reduced has been described above, but the processing in the case where the logical capacity of the memory device 401 is increased will be described below.

When the storage controller 201 receives the increase information indicating that the logical capacity is increased from the device controller 402 of the memory device 401 as the change notification of the logical capacity, the above-described RG-unallocated capacity distribution processing (FIG. 16) is performed to reconfigure the RAID group. When the logical capacity of the memory device 401 is increased due to the compression of data, since the logical capacity which is not allocated to any RAID group is increased, even the unallocated capacity is handled in the RAID group by the RG-unallocated capacity distribution processing, such that the logical capacity of the RAID group can be increased. That is, the RG-unallocated capacity supplement processing (FIG. 14) can be omitted.

The capacity change processing of the memory device 401 in the storage apparatus 101 according to the first embodiment is described above. In the present embodiment, the memory area is managed based on the RAID group 804-1 having six memory device configurations of 5D1P in the RAID5 and the RAID group 804-2 having the RAID configuration of four memory devices of 3D1P in the RAID5, but may also be the RAID configuration different therefrom. For example, in order to manage both the RAID group 804-1 and the RAID group 804-2 in the RG creation allowance device group 805-1 as the RAID configuration of the 5D1P, fixed data such as 0 data is stored in the memory device 401-8 and the memory device 401-9 having a small capacity provided, and the RAID configuration of the 5D1P including the fixed data may be realized. The fixed data are the mapping between the logical address and the physical address of the memory device 401, and the logical addresses of the fixed data are overlapped and allocated to the same physical address area, such that data can be stored without increasing the physical capacity. At this time, the memory device 401 is instructed to allocate the fixed data to the logical address via a special command.

Second Embodiment

Next, a distributed storage system according to a second embodiment of the present invention will be described. In the following description, differences from the first embodiment will be mainly described, and configurations equivalent to those of the first embodiment will be denoted by the same reference numerals, and a description thereof may be omitted.

Figure 18:
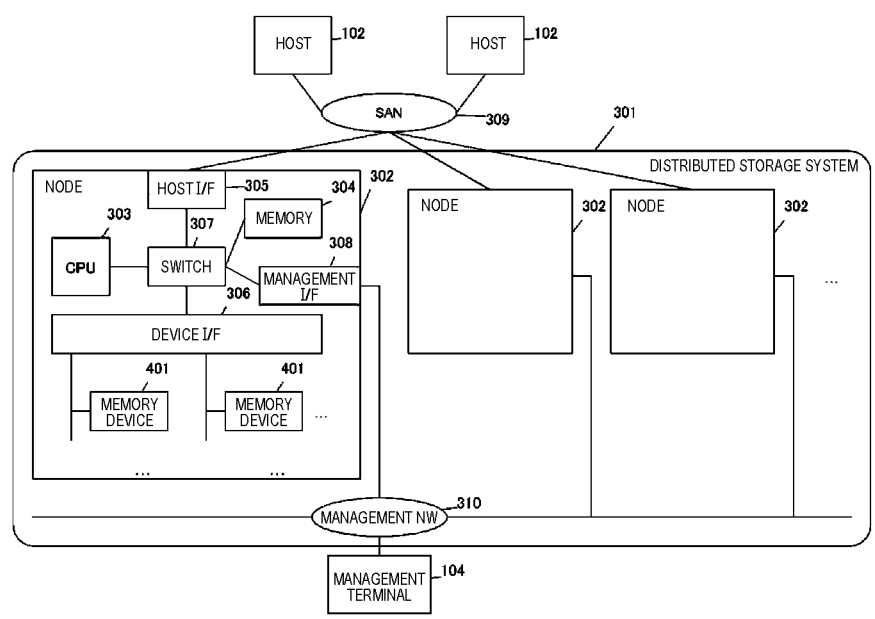
FIG. 18 is a configuration diagram of a distributed storage system to which the present invention is applied.

FIG. 18 shows a configuration diagram of the distributed storage system according to the present embodiment.

A distributed storage system 301 according to the present embodiment has a plurality of nodes 302. The nodes 302 are connected to each other via an SAN 103 and a management NW 105. One or more hosts (host computer) 102 is connected to the distributed storage system 301. In addition, a management terminal 104 is connected to the distributed storage system 301.

The node 302 includes a CPU 303, a memory 304, a host I/F 305, a device I/F 306, a management I/F 308, and a memory device 401. The CPU 303, the memory 304, the host I/F 305, the device I/F 306, and the management I/F 308 are connected to each other via a switch 307. In addition, the memory device 401 is connected to the device I/F 306.

The host I/F 305, the device I/F 306, the management I/F 308, and the switch 307 in the node 302 have functions equivalent to the host I/F 204, the device I/F 205, the management I/F 207, and the switch 206, respectively, of the storage controller 201.

The CPU 303 executes a predetermined program stored in the memory 304 to cooperate with each component in the same node 302 and other node 302 constituting the distributed storage system 301, thereby controlling the entire distributed storage system 301. The memory 304 is used to store a program executed by the CPU 303, various management information of the node 302 used by the CPU 303, and management information related to the entire distributed storage system 301. In addition, the memory 304 is also used for temporarily storing I/O target data for the memory device 401. The memory 203 is constituted by volatile storage media such as DRAM and SRAM, but as another embodiment, the memory 203 may be configured using a nonvolatile memory.

The node 302 and the host 102 are connected to each other via the SAN 309. The SAN 309 is formed by, for example, an Ethernet device.

The node 302 and the management terminal 104 are connected to each other via the management NW 310. The management NW 310 is formed by, for example, Ethernet.

It should be noted that the SAN 309 and the management NW 310 may be configured as the same network. For example, the node 302, the host 102, and the management terminal 104 may be connected to a network formed by the Ethernet.

The host 102 and the management terminal 104 have the same functions as those of the first embodiment. However, the host 102 may exist as a virtual machine at the node 302. In addition, an application executed by the host 102 may be executed on the node 302 instead of the host 102.

The memory device 401 has the same configuration as that of the first embodiment. In the present embodiment, when the number of usable logical capacities is increased by compressing data, the device controller 402 may transmit to the master node 302 the increase information indicating that the logical capacity is increased. The device controller 402 may transmit to the master node 302 the reduction information indicating that the usable logical capacity has been reduced when a part of the area cannot be used due to a failure of the nonvolatile semiconductor memory or the like. Hereinafter, the master node 302 will be described later.

Figure 19:
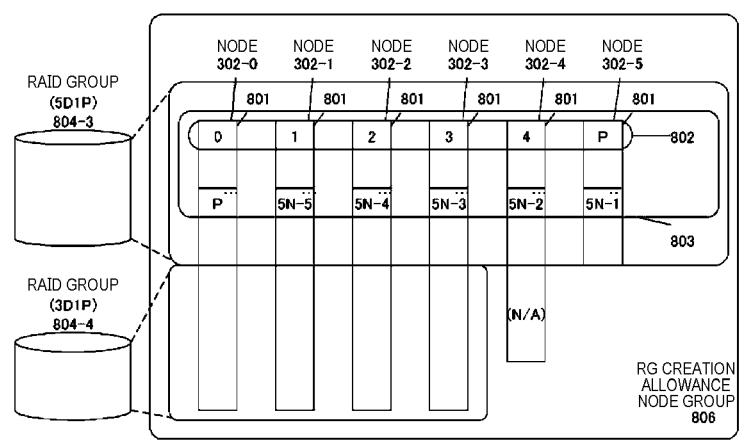
FIG. 19 is a diagram of the RAID configuration example in the distributed storage system.

FIG. 19 shows a RAID group configured in the distributed storage system 301. In the present embodiment, a memory area provided by a plurality of nodes 302 is managed as the RAID group. When a data access cannot be made due to a failure occurring in one (or two) of the nodes 302 within the RAID group, data in the remaining nodes 302 are used to be able to recover data stored in the broken memory device 401.

In FIG. 19, each of the nodes 302-0 to 302-5 indicates a logical address space (LBA space) provided by the node 302. Upper ends of the nodes 302-0 to 302-5 indicate a head address (LBA=0) of the logical address space, and lower ends thereof are ends of the logical address space. In the distributed storage system 301, the memory areas of a plurality of nodes 302 constitute one RAID group 804, and the logical address spaces (nodes 302-0 to 302-5) of each node 302 belonging to the RAID group 804 are managed by being divided into a plurality of memory areas having a fixed size called a stripe block 801.

In addition, in FIG. 19, like the example of FIG. 3, a RAID stripe 802, a chunk 803, and a RAID group 804 are configured with the stripe block 801 as a configuration unit.

In addition, in the distributed storage system 301 according to the present embodiment, a plurality of RG creation allowance node groups 806 are configured in order to limit combinations of the nodes 302 configuring the RAID group. The creation of the RAID group 804 between the plurality of nodes 302 belonging to different RG creation allowance node groups 806 is prohibited. That is, in the first embodiment, the RG creation allowance device group and a subgroup thereof are configured with a plurality of memory devices in units of memory devices, whereas in the present embodiment, an RG creation allowance node group 806 and a subgroup thereof are configured with a plurality of nodes in units of nodes.

For example, the CPU 303 of the master node 302 configures the RAID group using a plurality of nodes within the same RG creation allowance node group. For example, the CPU 303 of the master node 302 may configure a first RAID group using a first subgroup including a plurality of nodes devices within one RG creation allowance node group, and configure a second RAID group using a second subgroup including a plurality of nodes within the same RG creation allowance node group. All or some of the nodes among the plurality of nodes belonging to the first subgroup may belong to the second subgroup.

Figure 20:
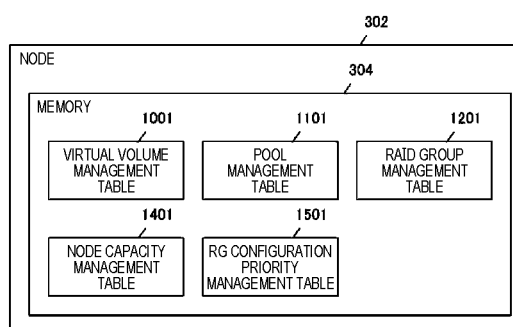
FIG. 20 is an explanatory diagram of management information of the distributed storage system.

FIG. 20 is a diagram showing the contents of management information stored in the memories 304 of each node 302 of the distributed storage system 301. A virtual volume management table 1001, a pool management table 1101, a RAID group management table 1201, a node capacity management table 1401, and an RG configuration priority management table 1501 is at least stored in the memories 304 of each node 302 of the distributed storage system 301.

Regarding the above management information, the management information on the entire distributed storage system 301 may not be stored in all the nodes 302. For example, the management information on the entire distributed storage system 301 may be stored only in some of the nodes 302 among all the nodes 302. These nodes 302 are referred to as the master node 302. Only the management information on the node 302 within the RG creation allowance node group 806 including its own node may be stored in the nodes 302 other than the master node 302. In addition, the processing performed by the storage controller 201 in the first embodiment may be performed by any of the nodes 302. For example, the processing performed by the storage controller 201 in the first embodiment may be performed by the master node 302, or may be performed by cooperation of the nodes 302 other than the master node 302 and the master node 302.

The RAID group management table 1201 has the same configuration as that of the first embodiment shown in FIG. 11, but differs from that of the first embodiment in terms of the following points. That is, in the first embodiment, an identifier (device #) of the memory device 401 is stored in a column 1207, but in the second embodiment, an identifier (node #) of the node 302 is stored. Therefore, in the second embodiment, the column 1207 is indicated by a node #1207.

Similarly, the RG configuration priority management table 1501 also has the same configuration as that of the first embodiment shown in FIG. 14, but differs from that of the first embodiment in terms of the following points. That is, in the first embodiment, the number of memory devices 401 configuring the RAID is stored in the column 1507, but in the second embodiment, the number of nodes 302 configuring the RAID is stored. Therefore, in the second embodiment, the column 1507 is indicated by the number of nodes #1507.

Figures 21, 22:
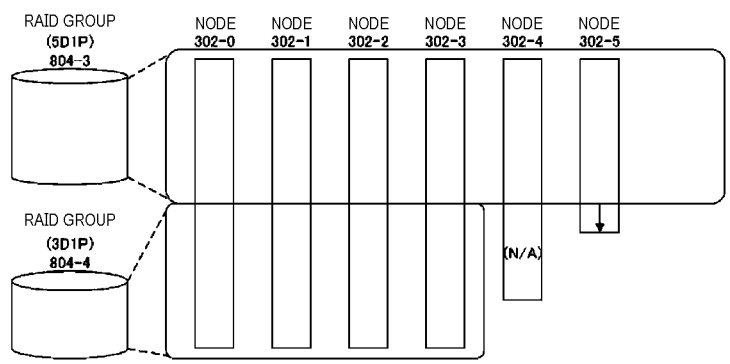
FIG. 21 is an explanatory diagram of a node capacity management table.
FIG. 22 is a diagram showing a RAID configuration example of the distributed storage system after the RG-unallocated capacity supplement processing.

FIG. 21 is a diagram for describing a configuration of the node capacity management table 1401.

The node capacity management table 1401 has columns of a node #1402, a logical capacity in use 1403, a free logical capacity 1404, an RG-unallocated logical capacity 1405, and an RG creation allowance group #1406.

The identifier of the node 302 is stored in the node #1402. The logical capacity in use 1403 indicates a capacity of a memory area occupied by the chunk 803 allocated to a virtual chunk 903. The free logical capacity 1404 indicates the capacity of the memory area not allocated to the virtual chunk 903 as the chunk 803. The RG-unallocated logical capacity 1405 indicates the capacity of the memory area not allocated to any RAID group 804. The RG creation allowance group #1406 indicates the identifier of the RG creation allowance node group 806 to which the node 302 belongs.

In the first embodiment, the logical capacity is managed in units of memory devices, whereas in the present embodiment, logical capacities of memory devices in each node are managed in units of nodes. Therefore, in the RG-unallocated capacity supplement processing and the RG-unallocated capacity distribution processing in the present embodiment, the free capacity, the RG-unallocated capacity and the like are determined for each node.

Next, the processing when changing the capacity of the node 302 in the distributed storage system 301 is shown. Here, regarding the RG creation allowance node group 806, the RAID configuration having six memory node configurations of 5D1P in RAID5 and the RAID configuration having four node configurations of 3D1P in RAID5 is configured from one having the highest priority in the RG configuration priority management table 1501.

First, the processing when increasing the logical capacity provided by the node 302-5 belonging to the RG creation allowance node group 806 shown in FIG. 19 will be described.

Upon receiving the increase information indicating the increase in the logical capacity from the node 302-5, the distributed storage system 301 may perform the RG-unallocated capacity distribution processing (FIG. 16) based on the received increase information. This is the same as in the first embodiment. However, regarding the processing that the storage apparatus 101 of the first embodiment refers to the memory device management table 1301, the distributed storage system 301 refers to the node capacity management table 1401. In the distributed storage system 301, any of the nodes 302 of the distributed storage system 301 may perform the RG-unallocated capacity supplement processing. For example, the master node 302 having the management information of the entire distributed system may be representatively performed.

FIG. 22 shows the configuration of the RAID group 804 after the master node 302 performs the RG-unallocated capacity supplement processing from the state of FIG. 19. At this time, since the node 302-5 increases the logical capacity, the RG-unallocated logical capacity as in the first embodiment is not reduced to less than 0, so the RG-unallocated capacity supplement processing (FIG. 14) can be omitted. Here, the RG-unallocated capacity distribution processing of FIG. 16 is performed by receiving a notification indicating the increase in the logical capacity from the node 302-5 belonging to the RG creation allowance node group 806.

Figure 23:
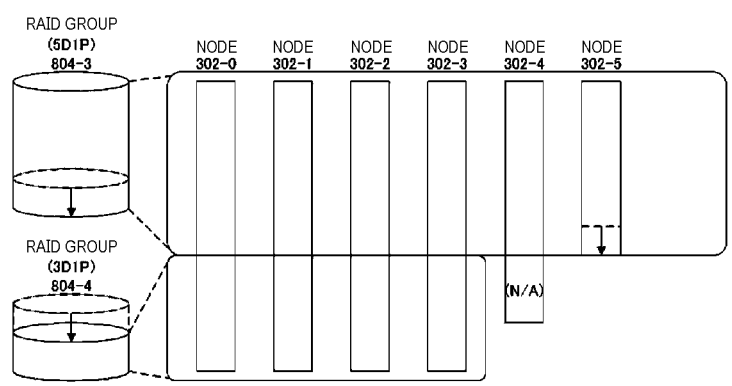
FIG. 23 is a diagram showing a RAID configuration example of the distributed storage system after the RG-unallocated capacity distribution processing.

FIG. 23 shows the configuration of the RAID group 804 after the master node 302 performs the RG-unallocated capacity distribution processing from the state of FIG. 22. Here, since the capacity of the node 302-5 which is the minimum capacity in the RG creation allowance node group 806 is increased, the RG-unallocated capacity distribution processing in FIG. 16 is performed, such that the memory capacity allocated to the RAID group 804-3 of the 5D1P configuration of the RAID5 having the high priority is increased. On the other hand, the logical capacity allocated to the RAID group 804-4 having the 3D1P configuration of the RAID5 having the low priority is reduced.

Next, the processing when reducing the logical capacity provided by the node 302-5 belonging to the RG creation allowance node group 806 shown in FIG. 19 will be described.

Upon receiving the reduction information indicating the reduction in the logical capacity from the node 302, the master node 302 may perform the RG-unallocated capacity supplement processing (FIG. 14) based on the received reduction information. Even in this case, the master node 302 refers to the node capacity management table 1401 instead of the memory device management table 1301 in the first embodiment. Similarly to the first embodiment, by the RG-unallocated capacity supplement processing, the unused logical capacity corresponding to the reduced capacity is released from the existing RAID group, and the RG-unallocated capacity of the RG creation allowance node group 806 which is reduced by the reduction of the logical capacity is recovered. With the end of the RG-unallocated capacity supplement processing, the master node 302 may perform the RG-unallocated capacity distribution processing (FIG. 16). Similar to the first embodiment, by the RG-unallocated capacity distribution processing, the RAID group is reconfigured and the RG-unallocated capacity is incorporated into the RAID group.

REFERENCE SIGNS LIST

101: Storage apparatus
102: Host
201: Storage controller
302: Node
401: Memory device
501: NVM chip
804: RAID group
901: Pool
902: Virtual volume

The invention claimed is:

1. A storage apparatus, comprising:
a plurality of memory devices; and
a storage controller configured to be connected to a host computer and provide the plurality of memory devices as a virtual volume to the host computer,
wherein each of the plurality of memory devices includes a plurality of nonvolatile semiconductor memories and a device controller providing the storage controller with a logical memory area associated with the plurality of nonvolatile semiconductor memories,
the storage controller manages the plurality of memory devices by dividing the plurality of memory devices into a plurality of device groups, configures a first RAID group using a first subgroup including a plurality of memory devices within a first device group among the plurality of device groups, and configures a second RAID group using a second subgroup including the plurality of memory devices within the first device group,
all or some of the memory devices among the plurality of memory devices belonging to the first subgroup also belong to the second subgroup,
the device controller transmits to the storage controller increase information indicating that a usable logical capacity of the plurality of nonvolatile semiconductor memories is increased, and
the storage controller adds an increased logical capacity of the first memory device to an unallocated capacity which is a logical capacity not allocated to the RAID group when the increase information is received from the first memory device which is a memory device of the first device group, releases from the first RAID group a first unused capacity, which is a logical capacity in which data are not written into the first RAID group, or from the second RAID group, a second unused capacity which is a logical capacity in which data are not written into the second RAID group, respectively, and reconfigures the first RAID group and the second RAID group so that a part or all of the unallocated capacities are allocated to the first RAID group or the second RAID group after the released logical capacity is added to the unallocated capacity.

2. The storage apparatus according to claim 1, wherein when a priority of the first RAID group is higher than that of the second RAID group, the storage controller reconfigures to allocate all or a part of the unallocated capacity of the first subgroup to the first RAID group and then reconfigures to allocate all or a part of the remaining unallocated capacity of the second subgroup to the second RAID group.

3. The storage apparatus according to claim 1, wherein the device controller transmits to the storage controller reduction information indicating that the usable logical capacity of the plurality of nonvolatile semiconductor memories is reduced, and
when receiving the reduction information from a second memory device which is a memory device belonging to the first subgroup and not belonging to the second subgroup, the storage controller sets a reduced logical capacity of the second memory device to a reduced capacity, releases the logical capacity equal to or greater than the reduced capacity of the first unused capacity from the first RAID group, and reconfigures the second RAID group using the second subgroup so that a part or all of the unallocated capacities are allocated to the second RAID group after the released logical capacity is added to the unallocated capacity.

4. The storage apparatus according to claim 1, wherein the device controller transmits to the storage controller reduction information indicating that the usable logical capacity of the plurality of nonvolatile semiconductor memories is reduced,
when receiving the reduction information from a third memory device which is a memory device belonging to the first subgroup and the second subgroup, the storage controller sets a reduced logical capacity of the third memory device to the reduced capacity, and all the second unused capacities are released from the second RAID group when a priority of the first RAID group is higher than that of the second RAID group, the first unused capacity is released from the first RAID group so that a total of the logical capacities released from the second RAID group is equal to or greater than the reduced capacity when the logical capacities released from the second RAID group are less than the reduced capacity, and the first RAID group is reconfigured using the first subgroup so that a part or all of the unallocated capacities are allocated to the first RAID group after the logical capacities released from the second RAID group and the first RAID group are added to the unallocated capacity.

5. The storage apparatus according to claim 1, wherein the first RAID group and the second RAID group provide different address spaces to the host computer.

6. The storage apparatus according to claim 1, further comprising:
   definition information on a RAID configuration of the first RAID group and a RAID configuration of the second RAID group,
   wherein the storage controller configures first and second RAID configurations according to definition information of tea table.

7. A distributed storage system having a plurality of nodes, wherein the plurality of nodes each have a CPU and a plurality of memory devices,
   the plurality of nodes are each connected to a host computer, and the plurality of memory devices of each node are provided to the host computer as a virtual volume,
   each of the plurality of memory devices includes a plurality of nonvolatile semiconductor memories and a device controller providing a storage management system with a logical memory area associated with the plurality of nonvolatile semiconductor memories,
   a CPU of a first node among the plurality of nodes manages the plurality of nodes by dividing the plurality of nodes into a plurality of node groups, configures a first RAID group using a first subgroup including a plurality of nodes within a first node group among the plurality of node groups, and configures a second RAID group using a second subgroup including the plurality of nodes within the first node group,
   all or some of the nodes among the plurality of nodes belonging to the first subgroup belong to the second subgroup,
   the device controller transmits to the CPU of the first node increase information indicating that a usable logical capacity of the plurality of nonvolatile semiconductor memories is increased, and
   the CPU of the first node adds an increased logical capacity of the first memory device to an unallocated capacity which is a logical capacity not allocated to the RAID group when the increase information is received from the first memory device which is a memory device of a node belonging to the first node group, releases from the first RAID group a first unused capacity, which is a logical capacity in which data are not written into a memory device of a node configuring the first RAID group, or from the second RAID group, a second unused capacity which is a logical capacity in which data are not written into a memory device of a node configuring the second RAID group, respectively, and reconfigures the first RAID group and the second RAID group so that a part or all of the unallocated capacities are allocated to the first RAID group or the second RAID group after the released logical capacity is added to the unallocated capacity.

8. The distributed storage system according to claim 7, wherein when a priority of the first RAID group is higher than that of the second RAID group, the CPU of the first node reconfigures to allocate all or a part of the unallocated capacity of the first subgroup to the first RAID group and then reconfigures to allocate all or a part of the remaining unallocated capacity of the second subgroup to the second RAID group.

9. The distributed storage system according to claim 7, wherein the device controller transmits to the CPU of the first node reduction information indicating that a usable logical capacity of the plurality of nonvolatile semiconductor memories is reduced, and
   when receiving the reduction information from a second memory device which is a memory device of a node belonging to the first subgroup and not belonging to the second subgroup, the CPU of the first node sets a reduced logical capacity of the second memory device to a reduced capacity, releases the logical capacity equal to or greater than the reduced capacity of the first unused capacity from the first RAID group, and reconfigures the second RAID group using the second subgroup so that a part or all of the unallocated capacities are allocated to the second RAID group after the released logical capacity is added to the unallocated capacity.

10. The distributed storage system according to claim 7, wherein the device controller transmits to the CPU of the first node reduction information indicating that a usable logical capacity of the plurality of nonvolatile semiconductor memories is reduced,
    when receiving the reduction information from a third memory device which is a memory device belonging to the first subgroup and the second subgroup, the CPU of the first node sets a reduced logical capacity of the third memory device to the reduced capacity, and
    all the second unused capacities are released from the second RAID group when a priority of the first RAID group is higher than that of the second RAID group, the first unused capacity is released from the first RAID group so that a total of the logical capacities released from the second RAID group is equal to or greater than the reduced capacity when the logical capacities released from the second RAID group are less than the reduced capacity, and the first RAID group is reconfigured using the first subgroup so that a part or all of the unallocated capacities are allocated to the first RAID group, after the logical capacities released from the second RAID group and the first RAID group are added to the unallocated capacity.

11. The distributed storage system according to claim 7, wherein the first RAID group and the second RAID group provide different address spaces to the host computer.

12. The distributed storage system according to claim 7, further comprising:
    definition information on a RAID configuration of the first RAID group and a RAID configuration of the second RAID group,
    wherein the storage controller configures first and second RAID configurations according to definition information of a table.

* * * * *